No. 639,729. Patented Dec. 26, 1899.
W. C. HOLTSCLAW.
ASH PAN.
(Application filed Oct. 18, 1898.)

(No Model.)

Witnesses
J. P. Britt

Inventor
W. C. Holtsclaw,
by O'_____
Attorneys.

THE NORRIS PETERS CO., PHOTO-LITHO., WASHINGTON, D. C.

UNITED STATES PATENT OFFICE.

WILLIAM CALHOON HOLTSCLAW, OF NEWPORT, TENNESSEE.

ASH-PAN.

SPECIFICATION forming part of Letters Patent No. 639,729, dated December 26, 1899.

Application filed October 18, 1898. Serial No. 693,896. (No model.)

*To all whom it may concern:*

Be it known that I, WILLIAM CALHOON HOLTSCLAW, a citizen of the United States, residing at Newport, in the county of Cocke and State of Tennessee, have invented a new and useful Ash-Pan, of which the following is a specification.

This invention is an improved construction of ash-pan, the object being to provide an exceedingly cheap and simple device from which the ashes or other contents can be quickly and easily discharged whenever desired; and another object is to provide means for holding the parts of the pan together until it is desired to discharge the contents; and with these objects in view the invention consists, essentially, of a pan having a hinged side adapted to swing down or out.

The invention consists in a spring-catch adapted to contact with the bail for carrying the pan, whereby when said bail is in an upright position the catches will be thrown inwardly and released when the said bail is thrown down.

The invention consists also in certain details of construction and novelties of combination, all of which will be fully described hereinafter and pointed out in the claim.

Figure 1:
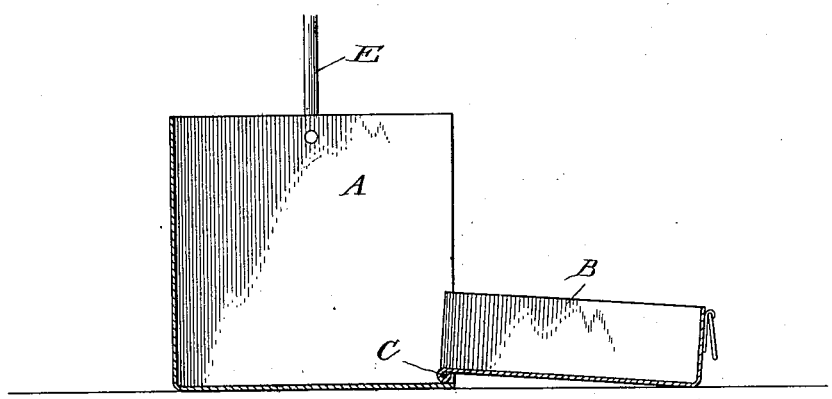
Figure 2:
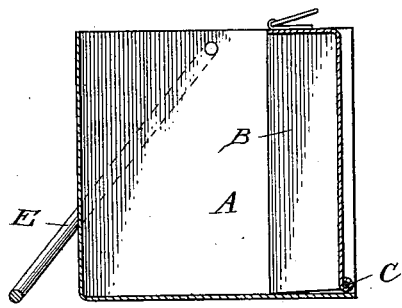
Figure 3:
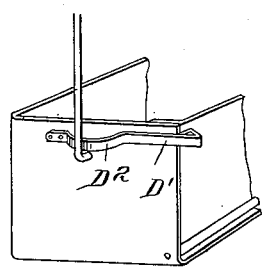
Figure 4:
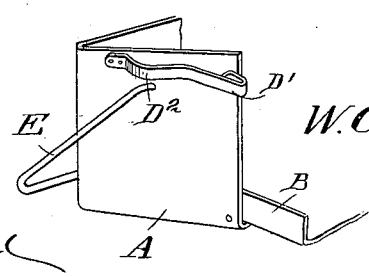

In the drawings forming part of this specification, Figure 1 is a transverse vertical section of an ash-pan constructed in accordance with my invention, the hinged side being thrown down. Fig. 2 is a transverse vertical section, the side being closed. Fig. 3 is an end view showing the spring-catch, and Fig. 4 is an end view showing the position of the parts when the catch is released.

In carrying out my invention I employ a box or receptacle A, formed of sheet metal or other suitable material, said box or receptacle having an open side, as most clearly shown in Figs. 1 and 2. The side B is hinged upon a rod C, which extends from one end of the box to another along the open side, and in this manner the side B is hinged to the box A and can be readily raised or lowered, as desired, and when raised it is held closed by means of spring-catches D', which are secured to the ends of the pan or box at a point beyond the pivotal point of the bail. The ends of the bail are pivoted to the ends of the pan at points below the body of the spring-catch D'. The body of the spring-catch D' is made with an outward swell or curve $D^2$, adjacent to the fastened end, which swell is adapted to contact with the bail when said bail is raised to an upright position, and when the bail contacts with this swell portion the free ends of the spring-catches are forced inwardly and securely hold the open sides; but when the bail is thrown down to a horizontal position, as shown in Fig. 4, the ends of the spring-catches spring outwardly and release the side.

Having thus fully described my invention, what I claim as new, and desire to secure by Letters Patent of the United States, is—

An improved ash pan or receptacle comprising a pan having a hinged side, of the spring-catches attached to the ends, and having heads adapted to overlap and hold the hinged side, said spring-catches having a swell or curved portion, and the bail pivoted to the ends of the pan at points below the spring-catch, and adjacent to the swell portion, the said bail being adapted to contact with said swell portion, substantially as shown and described.

WILLIAM CALHOON HOLTSCLAW.

Witnesses:
W. D. MCSWEEN,
LISTON LEWIS.